(12) United States Patent
Rizo Morente et al.

(10) Patent No.: US 12,081,161 B2
(45) Date of Patent: Sep. 3, 2024

(54) CONTROL SYSTEM AND METHOD FOR THE ROTOR SIDE CONVERTER OF A DOUBLY-FED INDUCTION GENERATOR IN A WIND TURBINE

(71) Applicant: Siemens Gamesa Renewable Energy Innovation & Technology S.L., Sarriguren (ES)

(72) Inventors: Mario Rizo Morente, Alcala de Henares (ES); Andres Agudo Araque, Madrid (ES); Mireia Barenys Espadaler, Alcalá de Henares (ES); Isaac Gude Rodriguez, Torrejón de Ardoz (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 71 days.

(21) Appl. No.: 17/611,193

(22) PCT Filed: May 11, 2020

(86) PCT No.: PCT/EP2020/063004
§ 371 (c)(1),
(2) Date: Nov. 15, 2021

(87) PCT Pub. No.: WO2020/234018
PCT Pub. Date: Nov. 26, 2020

(65) Prior Publication Data
US 2022/0302859 A1    Sep. 22, 2022

(30) Foreign Application Priority Data
May 22, 2019  (EP) ..................... 19380008

(51) Int. Cl.
*H02P 9/00*    (2006.01)
*H02P 101/15*    (2016.01)

(52) U.S. Cl.
CPC .......... *H02P 9/007* (2013.01); *H02P 2101/15* (2015.01)

(58) Field of Classification Search
CPC ...... H02P 9/007; H02P 2101/15; H02J 3/381; H02J 2300/28; Y02E 10/76
See application file for complete search history.

(56) References Cited

U.S. PATENT DOCUMENTS

| | | | |
|---|---|---|---|
| 7,423,412 B2* | 9/2008 | Weng | F03D 9/255 290/40 R |
| 8,587,160 B2* | 11/2013 | Dai | H02J 3/381 307/151 |

(Continued)

FOREIGN PATENT DOCUMENTS

| | | |
|---|---|---|
| CN | 101494424 A | 7/2009 |
| CN | 101521481 A | 9/2009 |

(Continued)

OTHER PUBLICATIONS

Seyed Behzad Naderi b, Michael Negnevitsky b, Amin Jalilian a, Mehrdad Tarafdar Hagh c, Kashem M. Muttaqi, "Low voltage ride-through enhancement of DFIG-based wind turbine using DC link switchable resistive type fault current limiter"; Nov. 15, 2016; 2016.

(Continued)

*Primary Examiner* — Julio C. Gonzalez
(74) *Attorney, Agent, or Firm* — Schmeiser, Olsen & Watts LLP

(57) ABSTRACT

A control method for the rotor side converter of a doubly-fed induction generator in a wind turbine for disturbances in the electric grid is provided. A control system includes a calculating unit configured for calculating at least one reference (Continued)

current. A current controller which is a hybrid controller configured to operate in two different modes, a first operating mode, set during a transient of a disturbance in an electric grid, where the current controller is configured to operate with a modulation index being outside a linear area and a second operating mode, set during a stable state of the disturbance in the electric grid, where the current controller is configured to operate with a modulation index inside the linear area, thereby instantly providing a maximum voltage available in a rotor so as to satisfy the at least one reference current.

13 Claims, 2 Drawing Sheets

(56) References Cited

U.S. PATENT DOCUMENTS

| | | | |
|---|---|---|---|
| 2008/0157529 | A1 | 7/2008 | Rivas et al. |
| 2009/0008993 | A1* | 1/2009 | Rozman ............... H02J 4/00 307/16 |
| 2010/0117605 | A1* | 5/2010 | Kretschmann ........ H02P 9/007 322/28 |
| 2011/0215775 | A1 | 9/2011 | Engelhardt |
| 2012/0299305 | A1 | 11/2012 | Brogan |
| 2016/0041567 | A1 | 2/2016 | Ko Thet et al. |
| 2019/0140569 | A1 | 5/2019 | Schnetzka et al. |

FOREIGN PATENT DOCUMENTS

| | | |
|---|---|---|
| CN | 101682286 A | 3/2010 |
| EP | 2704309 A2 | 3/2014 |
| TW | 565987 B | 12/2003 |
| WO | WO 2004098261 A2 | 11/2004 |
| WO | WO 2017202429 A1 | 11/2017 |

OTHER PUBLICATIONS

P. Cheng, H. Nian, C. Wu and Z. Q. Zhu, "Direct Stator Current Vector Control Strategy of DFIG Without Phase-Locked Loop During Network Unbalance," in IEEE Transactions on Power Electronics, vol. 32, No. 1, pp. 284-297, Jan. 2017; 2017.

Mohsen Rahimi, Mostafa Parniani; "Low voltage ride-through capability improvement of DFIG-based wind turbines under unbalanced voltage dips"; Mar. 22, 2014; 2014.

P. Cheng and H. Nian, "Collaborative Control of DFIG System During Network Unbalance Using Reduced-Order Generalized Integrators," in IEEE Transactions on Energy Conversion, vol. 30, No. 2, pp. 453-464, Jun. 2015; 2015.

M. Mohseni, S. M. Islam and M. A. S. Masoum, "Enhanced Hysteresis-Based Current Regulators in Vector Control of DFIG Wind Turbines," in IEEE Transactions on Power Electronics, vol. 26, No. 1, pp. 223-234, Jan. 2011; 2011.

M. Mohseni and S. M. Islam, "Transient Control of DFIG-Based Wind Power Plants in Compliance With the Australian Grid Code," in IEEE Transactions on Power Electronics, vol. 27, No. 6, pp. 2813-2824, Jun. 2012; 2012.

J. Mohammadi, S. Afsharnia, S. Vaez-Zadeh, "Efficient fault-ride-through control strategy of DFIG based wind turbines during the grid faults"; Nov. 16, 2013; 2013.

Jesús López, Pablo Sanchis, Eugenio Gubía, Alfredo Ursua and Luis Marroyo, Xavier Roboam; "Control of Doubly Fed Induction Generator under Symmetrical Voltage dips"; Jul. 2, 2008; 2008.

S. Xiao, H. Geng, H. Zhou and G. Yang "Analysis of the control limit for rotor-side converter of doubly fed induction generator-based wind energy conversion system under various voltage dips," in IET Renewable Power Generation, vol. 7, No. 1, pp. 71-81, Feb. 2013; 2013.

D. Santos-Martin, J. L. Rodriguez-Amenedo and S. Arnaltes, "Providing Ride-Through Capability to a Doubly Fed Induction Generator Under Unbalanced Voltage Dips," in IEEE Transactions on Power Electronics, vol. 24, No. 7, pp. 1747-1757, Jul. 2009. 2011 Mohseni; 2009.

Jackson John Justo, Francis Mwasilu, Jin-Woo Jung; "Enhanced crowbarless FRT strategy for DFIG based wind turbines under three-phase voltage dip"; Oct. 7, 2016; 2016.

Chomit M et al: "Extended vector control of doubly fed machine under unbalanced power network conditions" Proceedings of the 14th. International Symposium On Power Semiconductor Devices & ICS. ISPSD'02. Santa Fe, NM, Jun. 4-7, 2002; [International Symposium On Power Semiconductor Devices & IC's], New York, NY : IEEE. US.; pp. 329-334, XP010602931, ISBN: 978-0-7803-7318-1; the whole document; 2002.

H. Geng, C. Liu and G. Yang, "LVRT Capability of DFIG-Based WECS Under Asymmetrical Grid Fault Condition," in IEEE Transactions on Industrial Electronics, vol. 60, No. 6, pp. 2495-2509, Jun. 2013; 2013.

G. Abad, M. Á. Rodríguez, G. Iwanski and J. Poza, "Direct Power Control of Doubly-Fed-Induction-Generator-Based Wind Turbines Under Unbalanced Grid Voltage," in IEEE Transactions on Power Electronics, vol. 25, No. 2, pp. 442-452, Feb. 2010; 2010.

Norm VDE-AR-N 4120: "Technical requirements for the connection and operation of customer installations". 2014; 2014.

International Search Report and Written Opinion of the International Searching Authority issued Aug. 19, 2020 for Application No. PCT/EP2020/063004.

European Search Report and Written Opinion of the European Searching Authority issued Nov. 22, 2019 for Application No. 19380008.3.

PCT International Search Report mailed Aug. 19, 2020, corresponding to PCT International Application No. PCT/EP2020/063004.

PCT Written Opinion mailed Aug. 19, 2020, corresponding to PCT International Application No. PCT/EP2020/063004.

International Preliminary Report on Patentability mailed Mar. 24, 2021, corresponding to PCT International Application No. PCT/EP2020/063004.

Hu Jia-Bing et al: "Dynamic modelling and robust current control of wind-turbine driven DFIG during external AC voltage Dip", Ijournal of Zhejiang University Science A, Zhejiang University Press, CN, vol. 7, No. 10, Oct. 1, 2006.

Pena R et al: "Doubly fed induction generator using back-to-back PWM converters and its application to variable-speed wind-energy generation", IEE Proceedings; Electric Power Applications, Institution of Electrical Engineers, GB, vol. 143, No. 3, May 10, 1996.

Chomit M et al: "Extended vector control of doubly fed machine under unbalanced power network conditions", Proceedings of the 14th. International Symposium On Power Semiconductor Devices & ICS. ISPSD'02. Santa Fe, NM, Jun. 4-7, 2002; [International Symposium On Power Semiconductor Devices & IC's], New York, NY : IEEE, US, Jun. 4, 2002.

* cited by examiner

CONTROL SYSTEM AND METHOD FOR THE ROTOR SIDE CONVERTER OF A DOUBLY-FED INDUCTION GENERATOR IN A WIND TURBINE

CROSS-REFERENCE TO RELATED APPLICATIONS

This application claims priority to PCT Application No. PCT/EP2020/063004, having a filing date of May 11, 2020, which claims priority to EP Application No. 19380008.3, having a filing date of May 22, 2019, the entire contents both of which are hereby incorporated by reference.

FIELD OF TECHNOLOGY

The following relates to a control system and method for the rotor side converter of a doubly-fed induction generator in a wind turbine, for disturbances in the electric grid.

BACKGROUND

There is a great variety of controllers for the rotor side converter of a doubly-fed induction generator (DFIG) in a wind generator, which could be grouped into classical vector control, dual vector control and direct control controllers.

Vector control (VC) is the mostly used technique and it needs a pulse width modulator (PWM). The combination with the modulator offers a constant switching frequency and a low current harmonic content. It is known the publication "R. Pena, J. C. Clare and G. M. Asher, "Doubly fed induction generator using back-to-back PWM converters and its application to variable-speed wind-energy generation," in IEE Proceedings—Electric Power Applications, vol. 143, no. 3, pp. 231-241, May 1996". Vector control operation is acceptable enough under usual operating conditions, but it provides poor performance under fault or contingency conditions, such as for example voltage dips and overvoltage.

Dual vector control (DVC) adds a second controller to the original vector control (VC) so as to regulate the negative sequence, such as it is described in the publication "M. Chomat, J. Bendl and L. Schreier, "Extended vector control of doubly fed machine under unbalanced power network conditions," 2002 International Conference on Power Electronics, Machines and Drives (Conf. Publ. No. 487), 2002, pp. 329-334". Some recent works have improved the dual vector control (DVC) with alternative structures or generation of references for minimizing oscillations in the DC bus and torque. However, none of the known vector control or dual vector control techniques make the most of the converter performance or optimize operation thereof provided the thermal limitations, and they neither provide a full regulation capacity over the negative sequence in the most severe unbalanced dips.

Patent application US 2010/117605 A1 discloses a method and a device for operating an asynchronous motor with double feeds, having a stator connected to a grid and a rotor connected to an inverter. The inverter is designed such that it impresses a target value for an electrical variable in the rotor. Method allows for active reduction in the torque occurring during the transient grid voltage change.

Patent application US 2019/140569 A1 describes systems and methods for operating a power system having a doubly fed induction generator, power system including a power converter with a line-side converter, a DC link and a rotor-side converter. The rotor-side converter is configured to convert a DC power on the DC link to an AC signal for a rotor bus. The one or more control devices are configured to operate the rotor-side converter in an overmodulation regime to provide the AC signal for the rotor bus.

The use of direct control, in the group of which hysteresis control may be included, is quite widespread in DFIG converters. Contrary to linear controls as vector and dual vector controls, direct controls do not necessarily use a pulse width modulator (PWM), thereby the switching frequency is variable, and these are also usually much faster. Systems are known using a power direct control for minimizing active and reactive power ripples in the stator and for normal operating conditions. However, the systems require a high computational load, since otherwise the power quality would be seriously affected, something which is highly penalized by the grid codes (GCs).

The application of direct controls makes much more sense under transitory conditions of fault in the grid. Stator active and reactive power direct control systems are also known so as to obtain sinusoidal currents in the stator, minimization of the torque ripple or constant active power during unbalanced faults and variable-band hysteresis control systems with the object of having fast dynamics in the rotor current.

Interconnection of the distributed generation electric systems is ruled by the grid codes (GCs). Among other requirements, the grid codes refer to Low voltage (LVRT) and high voltage (HVRT) ride through, where the generating unit does not only have to remain connected, but it also injects reactive current into the positive sequence so as to counterbalance the disturbance. In this type of requirements, the grid codes (GCs) are more and more demanding regarding the dynamic response (number of sequence to be injected and time of response), the fault profile and the number of consecutive faults.

Wind generators based on doubly-fed induction generators (DFIG) are especially sensitive to disturbances in the grid voltage due to direct connection between the stator winding and the grid (see FIG. 1). As a consequence, during voltage dips and overvoltage, wherein the grid voltage changes abruptly, there are high transient currents in the stator and the rotor being produced due to the new magnetization working point of the generator. As the nominal power of the generating unit increases, the magnitude of these currents becomes dangerously nearer the ultimate tensile strength of existing low-voltage power electronic semiconductors, the isolated gate bipolar transistors (IGBT), thus forcing the disconnection of the equipment during disturbance and, therefore, and the non-compliance of the main grid code (GC) requirement. Furthermore, the presence of these transient currents limits the converter control so as to comply with the dynamic requirements, since it demands a lot of voltage from the rotor.

In case of asymmetric faults, as for example two-phased voltage drops, the electric system also has to face the presence of negative sequence voltages and currents. Regulation of the negative sequence in DFIG-based systems is not easy, since it demands higher rotor voltages, as it is set forth in the publication "R. Pena, J. C. Clare and G. M. Asher, "Doubly fed induction generator using back-to-back PWM converters and its application to variable-speed wind-energy generation," in IEE Proceedings—Electric Power Applications, vol. 143, no. 3, pp. 231-241, May 1996" cited above. If the control algorithm of the converter does not regulate the negative sequence correctly, the electric system (converter, generator, transformer and distributor) has to endure unnecessary high rotor and stator steady-state currents and an excessive use of the chopper. Consequently, the capacity of the system to face severe faults in amplitude and/or duration, and consecutive faults is seriously limited. Furthermore, in the particular case of the German grid code for wind farms connected to high voltage grids (standard [2] VDE), similarly to the above mentioned injection of reactive current in the positive sequence, the generating unit must also inject reactive current into the negative sequence.

In conclusion, compliance of the existing and future grid codes (and the electric system integrity), in the DFIG-based wind turbines when facing the LVRT and HVRT requirement, is under severe risk since:

The transient currents of the stator and of the rotor may be high enough so as to force disconnection of the generating unit.

Stationary currents of the rotor and the energy to be dissipated in the brake chopper may be high enough so as to force disconnection of the generating unit in large, deep and repetitive asymmetric voltage dips.

Regulation of the negative sequence is already compulsory in some grid codes (GC).

The control method for the rotor-side converter of a wind generator DFIG converter of the present invention improves the performance of the system upon the above disadvantages.

SUMMARY

An aspect relates to a control system and method for the rotor side converter of a doubly-fed induction generator in a wind turbine, for disturbances in the electric grid.

The present invention describes a control system rotor side converter of a doubly-fed induction generator in a wind turbine comprising:

a calculation unit configured for calculating at least one reference current, which is preferably a reference current of the rotor, and a current controller which is a hybrid controller configured to operate in two different modes, where a first operating mode, preferably set during a transient of a disturbance in an electric grid, where the current controller is configured to operate with a modulation index being outside a linear area and a second operating mode, preferably set during a stable state of the disturbance in the electric grid, where the current controller is configured to operate with a modulation index inside the linear area, thereby instantly providing a maximum voltage available in a rotor so as to satisfy the at least one reference current. In an embodiment, the rotor current is regulated, and it is an instantaneous controller configured for instantly providing a maximum voltage available in the rotor so as to satisfy the at least one reference current, preferably the rotor reference current.

The term "instantly providing" or "instantaneous" refers to providing the maximum voltage available in the rotor by the current controller in one single control step. In this way response time of the current controller is defined only by hardware capabilities and imposed control limits. This results in a fast response of the current controller.

The characteristics defining the controller are: instantaneous, hybrid and non-linear. On the one side, the fundamental principle of the controller operation is based on instantly minimizing the difference between the measured rotor current and the desired current, depending on the modulation index. On the other hand, in order to achieve this instantaneous nature, the control action is non-linear.

Finally, it is a hybrid controller since, depending on the capacity to satisfy the desired current commands, the controller operates in two different modes. The transition between modes may be automatic and it does not require any modification or state machine. In an embodiment, the operating modes are:

a first operation mode where the controller is configured to operate as a direct or hysteresis digital controller which provides one of the pulse width modulation (PWM) vectors being available in a two or more level converter in each of the control sampling times. In an embodiment, this first operating mode corresponds to a modulation index outside the linear area, that is, above the linear boundary limit or within the overmodulation area. This mode of operation is characterized by a limited variable switching frequency between a maximum frequency and a minimum frequency provided by the rotor frequency. Thus, the controller not only limits the conduction losses with the instantaneous response thereof, but it also reduces the switching losses when the conduction losses inevitably increase due to fault current increase, that is, it reduces the rotor current during the transient and satisfies the rotor reference current.

a second operating mode where the controller is configured to operate with a modulation index within the linear area and is configured to work as a controller which commands the control action within the linear area of the converter controlling the rotor current to the desired value. The controller in this second mode can be implemented with a proportional+integral (PI), resonant, deadbeat controller or the like.

Modulation index, known in the art, can be defined as a ratio of a magnitude of rotor voltage reference to one-half of available DC bus voltage.

Optionally, the control system also comprises a sequence sensor configured for separately evaluating a voltage and current positive sequence and negative sequence.

Optionally, the controller is prepared for regulating the current positive and negative sequence, where it is preferably configured for regulating the measured rotor current following the at least one rotor reference current.

The at least one reference current of the rotor is calculated so as to comply with the grid code reactive current requirements.

Optionally, the system comprises a modulating block configured to operate in the first operating mode at a variable switching frequency, being preferably inversely proportional to an error in the current.

Optionally, the modulating block is configured to operate in the second operating mode at a constant switching frequency.

Optionally, the system also comprises a sequence sensor configured for separately evaluating a voltage and current positive and negative sequence.

Optionally, the system also comprises a calculating unit configured for calculating at least one reference current, preferably the reference current of the rotor, which can be realized by the rotor converter in a stationary state, as a function of the voltage and current positive sequences and negative sequences evaluated by the sequence sensor.

Optionally, the calculating unit is also configured for calculating at least one reference current of the stator as a function of the voltage and current positive sequence and negative sequence, evaluated by the sequence sensor.

Optionally, the calculating unit is also configured for calculating at least one total line reference current as a function of the voltage and current positive sequence and negative sequence, evaluated by the sequence sensor.

Optionally, the instantaneous current controller is also configured for simultaneously regulating the positive sequence and the negative sequence of the rotor current and/or stator current and/or line current.

A second aspect of the present invention describes a control method for the rotor side converter of a doubly-fed induction generator in a wind turbine carried out with the system described above, comprising:
- a step for calculating at least one reference current, which is preferably a reference current of the rotor, and
- a step for current regulation, preferably a step for regulating the rotor current, where a maximum voltage available in the rotor is instantaneously provided so as to satisfy the at least one reference current, preferably the reference current of the rotor.

The step for current regulation comprises:
- a first operating mode, preferably set during a transient of a disturbance in an electric grid, corresponding to a modulation index being outside the linear area and
- a second operating mode, preferably set during a stable state of the disturbance in the electric grid, corresponding to a modulation index inside the linear area.

Thus constituted, the control system and method for the rotor side converter of a doubly-fed induction generator in a wind turbine features the following advantages:
- it brings up optimization of the converter operation during the transients produced by the faults in the grid: that is, it reduces the fault currents to the maximum as well as reducing the switching losses with the subsequent reduction of thermal stress;
- it increases the dynamics so as to comply with the objectives established by the GCs, and
- it offers total regulation over the positive and negative sequence to be controlled in severe unbalanced faults.

BRIEF DESCRIPTION

Some of the embodiments will be described in detail, with reference to the following figures, wherein like designations denote like members, wherein.

DETAILED DESCRIPTION

Figure 1:
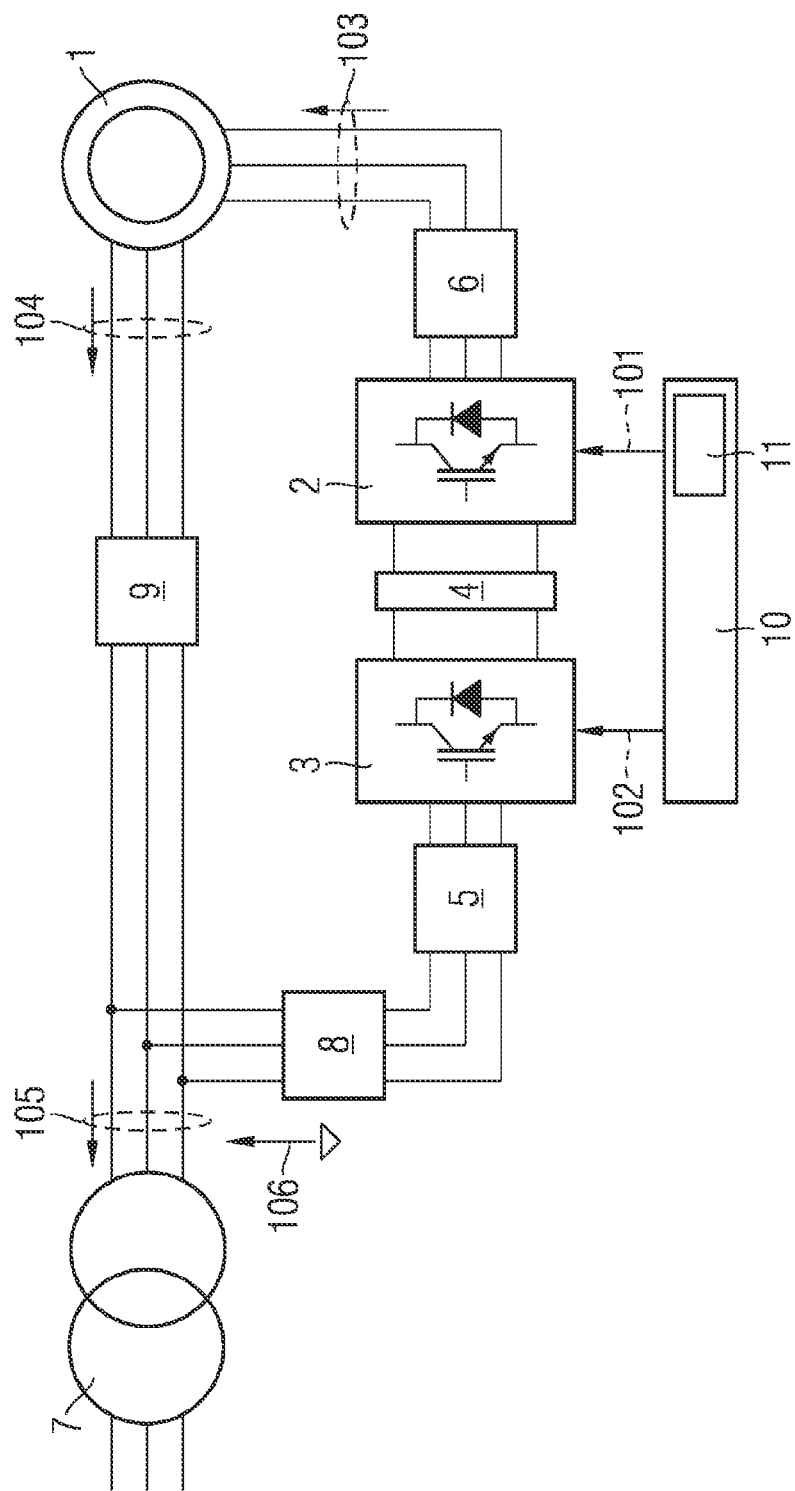
FIG. 1 shows an electric scheme of a wind turbine with a DFIG generator.
Figure 2:
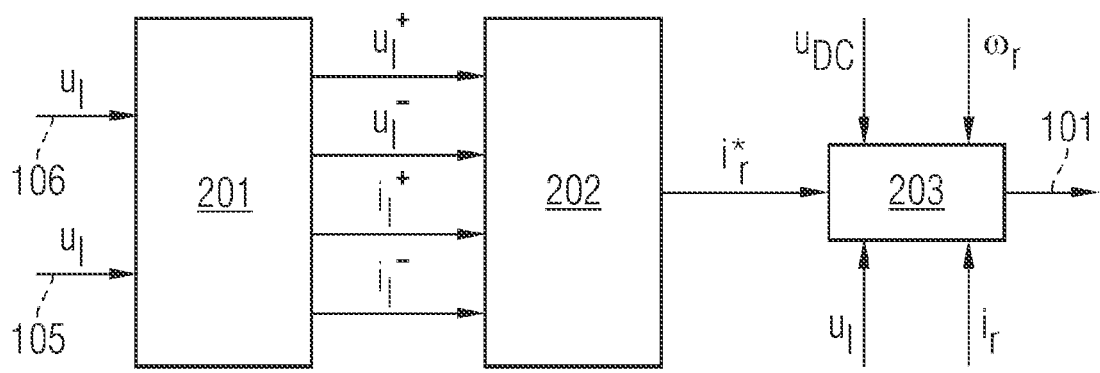
FIG. 2 shows a scheme of the control system for the rotor side converter of a DFIG converter of a wind turbine of the present invention.

The following is a detailed description of the electric system of a doubly-fed induction generator (1) of a wind turbine and the associated control method for the rotor side converter (2) of the present invention. The winding of the doubly-fed induction generator (1) is connected to a rotor three-phase bridge (2). The rotor side converter shares its DC connection (4) with a three-phase grid bridge (3). The three-phase AC connection of the grid bridge (3) may comprise a three-phase power filter (5). Likewise, the AC three-phase connection of the rotor side converter (2) may comprise a three-phase power filter (6). The stator winding and the AC three-phase connection of the grid bridge are connected to the low voltage winding of a three-phase boost transformer (7). Both the stator winding and the AC three-phase connection of the grid bridge may have contactors (8) and switches (9), so as to make electric operation easier and guarantee protection. Both the rotor side converter (2) and the grid bridge (3) are commanded by the trigger signals (101, 102), of the semiconductor devices thereof. A calculation and control (10) logic unit is in charge of providing the trigger signals (101, 102).

In the calculation and control logic unit (10) is where the control method of the present invention is implemented in. The control system (11) for the rotor side converter of a doubly-fed induction generator in a wind turbine, according to this embodiment, comprises:
- a sequence sensor (201) configured for separately evaluating a voltage and current positive sequence and negative sequence.
- a calculating unit (202) for calculating at least a reference current ($i^*_r$), preferably the reference current of the rotor, in stationary state, as a function of the voltage and current positive sequences and negative sequences evaluated by the sequence sensor (201).
- a current controller (203), preferably for the rotor current (103) or alternatively for the stator current (104) or for the line current (105), where the current controller (203) is an instantaneous controller for instantaneously providing a maximum voltage (106) available in the rotor so as to satisfy the at least one reference current ($i^*_r$), and it is also a non-linear hybrid controller configured for providing a rotor voltage, within an available voltage range. The current controller (203) comprises pulse width modulation logic (PWM). The current controller (203) provides the trigger signals (101) of the rotor three-phase bridge (2).

The current controller (203) may operate into two different modes. The transition between modes is automatic and it does not require any modification or state machine. These modes are:
- A first operating mode where the current controller (203) works as a direct, hysteresis digital controller or the like, which provides one of the pulse width modulator vectors available in a two or more level converter at each control sampling time, where this first operating mode corresponds to a modulation index being outside the converter linear area, that is, within the overmodulation area. The overmodulation operation implies the possibility to work with high modulation indexes including a maximum theoretical limit. Thus, an operation featuring a variable switching frequency is obtained.
- A second operating mode where the current controller (203) is configured to work as a deadbeat controller, or the like, which commands the control action that instantaneously brings the current under control to the desired value, where this second operating mode is carried out with a modulation index within the linear area of the converter. In this second operating mode, the switching frequency is constant. The method is configured for setting the current controller (203) in this second operating mode, preferably during the stable state of the fault, that is, when the current commands can be instantaneously reached.

The current controller (203) is also an instantaneous controller configured for regulating the current positive and negative sequences and for regulating, preferably, the measured current of the rotor following the at least one rotor current reference, which is supplied by outer blocks providing reference currents that can be realized by the rotor converter in stationary state.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A control system for a rotor side converter of a doubly-fed induction generator in a wind turbine, the control system comprising:
   a calculating unit configured for calculating at least one reference current;
   a current controller which is a hybrid controller configured to operate in two different modes:
      a first operating mode, set during a transient of a disturbance in an electric grid, wherein the current controller is configured to operate with a modulation index being above a linear boundary limit of the modulation index; and
      a second operating mode, set during a state when current commands can be instantly reached, wherein the current controller is configured to operate with a modulation index below a linear boundary limit of the modulation index, thereby instantly providing a maximum voltage available in a rotor to achieve the at least one reference current;
   wherein the current controller is also configured for simultaneously regulating a positive and a negative sequence of the rotor current; and
   a sequence sensor configured for separately evaluating a voltage and current positive sequence and negative sequence, wherein the calculating unit is configured for calculating the at least one reference current as a function of the voltage and current positive sequences and negative sequences evaluated by the sequence sensor, wherein the calculating unit is also configured for calculating the at least one stator reference current as a function of the voltage and current positive sequence and negative sequence evaluated by the sequence sensor.

2. The control system according to claim 1, wherein in the first operating mode, the current controller is configured to operate as a direct or hysteresis digital controller that provides one of the pulse width modulation vectors available in a two or more level converter at each one of the control sampling times.

3. The control system according to claim 1, wherein in the second operating mode, the current controller is configured to work as a controller which commands the control action within a linear area of the converter controlling the rotor current to the desired value.

4. The control system according to claim 1, further comprising a modulating block configured to operate in the first operating mode at a variable switching frequency.

5. The control system according to claim 4, wherein the modulating block is configured to operate in the first operating mode at a switching frequency being variable and inversely proportional to an error in the current.

6. The control system according to claim 4, wherein the modulating block is configured to operate according to the second operating mode at a constant switching frequency.

7. The control system according to claim 1, wherein the current controller is also configured for controlling stator current with a stator reference current.

8. The control system according to claim 1, wherein the current controller is also configured for controlling line current of the wind turbine with a line current reference.

9. The control system according to claim 1, wherein the calculating unit is also configured to calculate the at least one total reference line current as a function of the voltage and current positive sequence and negative sequence evaluated by the sequence sensor.

10. The control system according to claim 1, wherein the current controller is also configured for simultaneously regulating a positive and a negative sequence of the stator current.

11. The control system according to claim 1, wherein the instantaneous current controller is also configured for simultaneously regulating a positive and a negative sequence of the line current.

12. A control method for a rotor side converter of a doubly-fed induction generator in a wind turbine carried out with the control system of claim 1, wherein the method comprises:
   calculating the at least one reference current; and
   regulating the rotor current, where a maximum voltage available in the rotor is instantaneously provided so as to satisfy the at least one reference current, wherein the regulating comprises:
   a first operating mode, set during a transient of a disturbance in an electric grid, corresponding to a modulation index being outside the linear area; and
   a second operating mode, set during a stable state of the disturbance in the electric grid, corresponding to a modulation index inside the linear area.

13. A control system for a rotor side converter of a doubly-fed induction generator in a wind turbine, the control system comprising:
   a calculating unit configured for calculating at least one reference current;
   a current controller which is a hybrid controller configured to operate in two different modes:
      a first operating mode, set during a transient of a disturbance in an electric grid, wherein the current controller is configured to operate with a modulation index being above a linear boundary limit of the modulation index; and
      a second operating mode, set during a state when current commands can be instantly reached, wherein the current controller is configured to operate with a modulation index below a linear boundary limit of the modulation index, thereby instantly providing a maximum voltage available in a rotor to achieve the at least one reference current;
   wherein the current controller is also configured for simultaneously regulating a positive and a negative sequence of the rotor current; and
   a sequence sensor configured for separately evaluating a voltage and current positive sequence and negative sequence, wherein the calculating unit is configured for calculating the at least one reference current as a function of the voltage and current positive sequences and negative sequences evaluated by the sequence sensor, and wherein the calculating unit is also configured to calculate the at least one total reference line current as a function of the voltage and current positive sequence and negative sequence evaluated by the sequence sensor.

* * * * *